United States Patent
Nagashima et al.

(10) Patent No.: US 7,267,716 B2
(45) Date of Patent: Sep. 11, 2007

(54) AQUEOUS INK, IMAGE RECORDED USING SAID AQUEOUS INK AND METHOD FOR FORMING SAID IMAGE

(75) Inventors: Akira Nagashima, Tokyo (JP); Masako Udagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/193,377

(22) Filed: Aug. 1, 2005

(65) Prior Publication Data

US 2006/0021545 A1 Feb. 2, 2006

Related U.S. Application Data

(63) Continuation of application No. PCT/JP2003/008093, filed on Jun. 26, 2003.

(30) Foreign Application Priority Data

Feb. 20, 2003 (JP) .............................. 2003-043239

(51) Int. Cl.
 C09D 11/02 (2006.01)
 G01D 11/00 (2006.01)

(52) U.S. Cl. ............... 106/31.6; 106/31.75; 106/31.28; 347/100

(58) Field of Classification Search ............... 106/31.6, 106/31.75, 31.28; 347/100
See application file for complete search history.

(56) References Cited

U.S. PATENT DOCUMENTS

| 5,078,790 A | 1/1992 | Tochihara et al. ............ 106/20 |
| 5,080,716 A | 1/1992 | Aoki et al. .................... 106/20 |
| 5,131,949 A | 7/1992 | Tochihara et al. ............ 106/20 |
| 5,132,700 A | 7/1992 | Tochihara et al. ........... 346/1.1 |
| 5,213,613 A | 5/1993 | Nagashima et al. ...... 106/20 R |
| 5,221,334 A | 6/1993 | Ma et al. ....................... 106/20 |
| 5,258,066 A | 11/1993 | Kobayashi et al. ........ 106/22 R |
| 5,272,201 A | 12/1993 | Ma et al. ..................... 524/505 |
| 5,296,022 A | 3/1994 | Kobayashi et al. ........ 106/20 D |
| 5,409,529 A | 4/1995 | Nagashima et al. ...... 106/22 H |
| 5,451,251 A | 9/1995 | Mafune et al. ........... 106/22 H |
| 5,478,383 A | 12/1995 | Nagashima et al. ...... 106/22 H |
| 5,482,545 A | 1/1996 | Aoki et al. ............... 106/22 K |
| 5,519,085 A | 5/1996 | Ma et al. .................... 524/503 |

(Continued)

FOREIGN PATENT DOCUMENTS

EP 1 088 860 4/2001

(Continued)

OTHER PUBLICATIONS

CAB-O-JET® 300 Black Colorant (1997).
Sep. 29, 2006 Chinese Official Action (with English-language translation).

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

An aqueous ink containing at least a water-dispersible coloring material and a water-soluble crystalline component, characterized in that the water-dispersible coloring material forms an aggregate around a crystal of the crystalline component formed as the content of the aqueous ink decreases, which ink may further contain a water-soluble coloring material.

7 Claims, 7 Drawing Sheets

U.S. PATENT DOCUMENTS

| | | | |
|---|---|---|---|
| 5,693,126 A | 12/1997 | Ito | 106/20 |
| 5,733,363 A | 3/1998 | Nagashima et al. | 106/31.43 |
| 5,852,075 A | 12/1998 | Held | 523/161 |
| 5,854,331 A | 12/1998 | Ma et al. | 524/505 |
| 5,865,883 A | 2/1999 | Teraoka et al. | 106/31.32 |
| 5,936,649 A | 8/1999 | Ikeda et al. | 347/87 |
| 6,117,921 A | 9/2000 | Ma et al. | 523/161 |
| 6,153,001 A * | 11/2000 | Suzuki et al. | 106/31.65 |
| 6,238,045 B1 * | 5/2001 | Ono et al. | 347/96 |
| 6,375,728 B2 * | 4/2002 | Yamashita et al. | 106/31.6 |
| 6,676,254 B2 * | 1/2004 | Nagashima et al. | 347/100 |
| 6,749,675 B2 | 6/2004 | Momose | 106/31.58 |
| 6,780,901 B1 * | 8/2004 | Endo et al. | 523/161 |
| 2002/0002930 A1 * | 1/2002 | Yamashita et al. | 106/31.6 |
| 2002/0037947 A1 | 3/2002 | Suzuki et al. | 523/160 |
| 2002/0047884 A1 * | 4/2002 | Nagashima et al. | 347/100 |
| 2002/0063765 A1 * | 5/2002 | Hakamada et al. | 347/100 |
| 2003/0037699 A1 * | 2/2003 | Yatake | 106/31.58 |
| 2004/0027404 A1 | 2/2004 | Nagashima et al. | 347/8 |
| 2004/0231554 A1 | 11/2004 | Udagawa et al. | 106/31.15 |
| 2005/0052515 A1 | 3/2005 | Udagawa et al. | 347/100 |
| 2005/0088501 A1 | 4/2005 | Nagashima et al. | 347/100 |
| 2005/0109952 A1 | 5/2005 | Udagawa et al. | 250/461.1 |
| 2005/0195243 A1 | 9/2005 | Nagashima et al. | 347/54 |
| 2006/0012657 A1 | 1/2006 | Nagashima et al. | 347/100 |
| 2006/0021545 A1 | 2/2006 | Nagashima et al. | 106/31.27 |

FOREIGN PATENT DOCUMENTS

| | | |
|---|---|---|
| EP | 1 164 175 | 12/2001 |
| JP | 5-179183 | 7/1993 |
| JP | 6-136311 | 5/1994 |
| JP | 7-53841 | 6/1995 |
| JP | 8-231911 | 9/1996 |
| JP | 10-87768 | 4/1998 |
| JP | 11-43639 | 2/1999 |
| JP | 11-236502 | 8/1999 |
| JP | 11-269418 | 10/1999 |
| JP | 2001-164158 | 6/2001 |
| JP | 2001-240777 | 9/2001 |
| JP | 2002-69350 | 3/2002 |
| JP | 2002-226750 | 8/2002 |
| JP | 2002-363450 | 12/2002 |
| JP | 2002-363452 | 12/2002 |

* cited by examiner

AGGLOMERATION OF
WATER DISPERSIBLE
COLORING MATERIAL

AGGREGATE OF WATER
DISPERSIBLE COLORING MATERIAL

CELLULOSE FIBER

AGGLOMERATION OF WATER DISPERSIBLE COLORING MATERIAL IN WHICH WATER SOLUBLE COLORING MATERIAL IS TAKEN

AGGLOMERATION OF WATER DISPERSIBLE COLORING MATERIAL

WATER SOLUBLE COLORING MATERIAL DISSOLVED IN NEAR MONOMOLECULAR STATE

AQUEOUS INK, IMAGE RECORDED USING SAID AQUEOUS INK AND METHOD FOR FORMING SAID IMAGE

This application is a continuation of International Application No. PCT/JP03/08093 filed on Jun. 26, 2003, which claims the benefit of Japanese Patent Application No. 2003-043239, filed on Feb. 20, 2003.

BACKGROUND OF THE INVENTION

1. Field of the Invention

The present invention relates to an aqueous ink and a recorded image formed with the ink. More specifically, the present invention relates to an aqueous ink containing at least a coloring material dispersible in water, which has reliability such as satisfactory anti-sticking property, and is capable of providing an image with satisfactory quality and fastness.

2. Related Background Art

Conventionally, various proposals and reports have been made for aqueous ink including hand writing ink and ink jet ink to improve anti-sticking property of ink (the ink does not or hardly form sticking matter) and to improve quality and fastness of the recorded matter.

Conventionally, aqueous ink employs water-soluble coloring materials. Therefore, aqueous ink has satisfactory reliability such as anti-sticking property and long-term stability, and provides recorded images of satisfactory quality. However, image fastness, e.g., resistance to water and light fastness, is not satisfactory with such ink in many cases.

Meanwhile, in order to enhance image fastness such as water fastness and light fastness, attempts have been made to use a coloring material such as carbon black and organic pigments dispersed in an aqueous ink in recent years.

These coloring materials are used in a condition dispersed in an aqueous system by chemical or physical actions of a surfactant or resin. Thus when the pigment in a stable dispersion state is applied to a recording medium, the stable dispersion state is disrupted and the pigment coagulates, which provides the recorded matter with good water fastness and light fastness. On the other hand, recording with such ink tends to reduce saturation of the colored portion owing to the coagulation of the coloring material on the recording medium. Furthermore, when an ink containing a water-dispersible coloring material is used for an ink jet head, evaporation of the water or solvent in the ink occurs near the nozzle of the head, which breaks stable dispersion state of the coloring material causing coagulation thereof. Thus, sticking and clogging will occur in the nozzle.

To solve the above-mentioned problems, Japanese Patent Application Laid-Open No. H08-231911 proposes an aqueous ink containing a solid solution obtained by dissolving a hardly water-soluble or water insoluble coloring material in a molten liquid of a water-soluble material which is solid at ordinary temperature, or fine colored particles prepared by making the above solid solution into fine particles of a particle diameter small enough to be stably dispersed in water. This publication describes that when the ink is applied to a recording medium, the solid solution penetrates into the recording material with water, but the water-insoluble fine particles of the coloring material coagulate on the surface of the recording medium to provide a recorded matter excellent in water fastness. Furthermore, this publication describes that near the nozzle of the ink jet head, the coloring material is dissolved in a crystal phase of the solid solution, which prevents precipitation of the coloring material alone. Thus, when fresh ink is supplied from the rear of the nozzle by an operation such as suction, the solid components are solubilized, solving sticking.

In consideration of the stability of the fine particles in the ink using finely powdered coloring material as described above, it is necessary to make the coloring material into fine particles having dimension of, for example, approximately 25 nm. However, if the coloring material is finely powdered, the coloring material is hardly adsorbed to the surface of the recording medium (in other words, permeability of the coloring material fine particles is increased). Thus, it is difficult, in some cases, to obtain high print density. Furthermore, although anti-sticking property may be improved by the use of the above-mentioned solid solution, as drying progresses near the nozzle, the solid component of the solid solution becomes a hard mass. As a result, even if a recovery operation by suction is performed, fresh ink is hardly supplied from the rear of the nozzle. In the worst case, the solidified mass is not removed even if the recovery operation by suction is performed.

SUMMARY OF THE INVENTION

The present invention was made for solving the above-mentioned problems in an aqueous ink containing a coloring material such as a pigment dispersed in water (hereinafter, referred to as a water-dispersible coloring material). Therefore, it is an object of the present invention to provide an aqueous ink of which reliability such as anti-sticking property is improved, which has been desired in an aqueous ink containing a water-dispersible coloring material, fully maintaining advantages of dispersible coloring materials such as high fastness and high print quality. It is also an object of the present invention to provide a recorded image formed with such an aqueous ink.

The above-mentioned objects can be achieved by the present invention as follows.

In one embodiment of the aqueous ink according to the present invention, the aqueous ink comprises an aqueous medium, a coloring material dispersed in the aqueous medium, and a crystalline substance that is solid as a simple substance in an ordinary temperature environment and is water-soluble, wherein the crystalline substance crystallizes as the water content in the aqueous ink decreases from the initial condition where the coloring material is dispersed and the crystalline substance is dissolved; and an aggregate of the coloring material is formed around the crystal as a core.

In another embodiment of the aqueous ink according to the present invention, the aqueous ink comprises an aqueous medium, a water dispersible coloring material dispersed in the aqueous medium, and a water-soluble substance is a crystalline simple substance and can hold the water dispersible coloring material around the crystal thereof. Further, the aqueous ink shows a more excellent effect through the fact that the water-soluble substance has a ring structure. Moreover, the aqueous ink further ensures the effect by having an organic solvent dissolving the water soluble substance and containing the water-soluble substance in an amount equal to or greater than a saturated concentration with respect to the organic solvent. Specifically, the water-soluble substance is ethylene urea. Moreover, the aqueous ink can secure excellent sticking resistance by containing a water-soluble dye dissolved in the aqueous ink. In addition, the aqueous ink can form an image containing a pigment while obtaining fluorescent emission by containing a fluorescent dye dissolved in the aqueous ink. Moreover, a record image formed on a fibrous recording medium can be an unconventional image by use of any of the aqueous ink. Then, according to a method of forming an image characterized by including: discharging any of the aqueous ink described above as an ink droplet from an ink jet head; and applying the ink droplet onto a recording medium to form an image, action by the following mechanism can be performed more certainly in the process of fixing the ink droplet.

In still another embodiment of the aqueous ink according to the present invention, the aqueous ink comprises an aqueous medium, a coloring material dispersed in the aqueous medium, a water-soluble coloring material, and a crystalline substance being solid as a simple substance in an ordinary temperature environment and being water-soluble, wherein the crystalline substance crystallizes as the water content in the aqueous ink decreases from the initial condition where the coloring material is dispersed and the crystalline substance and the water-soluble coloring material are dissolved in the ink, and the coloring material forms an aggregate around a crystal of the crystalline substance as a core.

A recorded matter according to the present invention is obtained by applying an aqueous ink above described on a recording medium.

DESCRIPTION OF THE PREFERRED EMBODIMENTS

Figure 1:
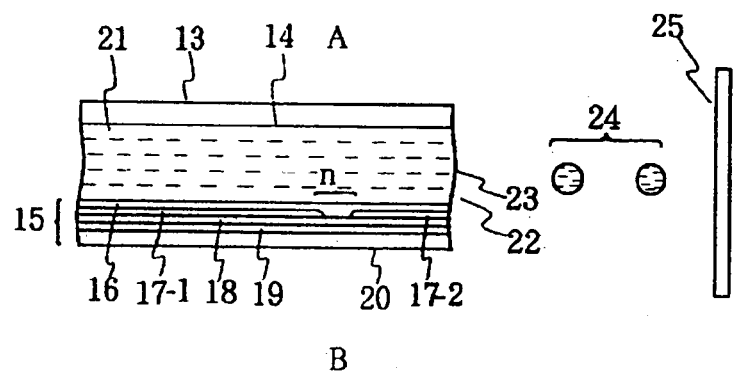
FIG. 1 is a cross sectional view in a longitudinal direction of a head of an ink jet recording apparatus.

Hereinafter, the present invention will be described in detail by showing preferred embodiments for carrying out the invention.

Initially, an aqueous ink of the present invention, which has reliability such as satisfactory anti-sticking property and also can provide a recorded matter having satisfactory quality and fastness, is described.

The inventors of the present invention considered various mechanisms and studied various coloring materials and ink compositions in order to improve reliability such as anti-sticking property of an aqueous ink employing a water-dispersible coloring material, that is, a coloring material that can be dispersed in water or in an aqueous medium containing water as a main component, securing quality and fastness of the recorded matter. As a result, it has been found out that, when an aqueous ink contains a water-dispersible coloring material and a crystalline substance that is solid in an ordinary temperature environment and soluble in water as the ink components, the crystalline substance crystallizes as the water content is reduced and the water-dispersible coloring material aggregates around a crystal as a core. Based on the fact that such an aqueous ink not only can provide a recorded matter having satisfactory quality and fastness but also has improved reliability such as anti-sticking property, the inventors have completed the present invention.

Furthermore, it has been found out that, if a combination of coloring materials including at least a water-dispersible coloring material and a water-soluble coloring material is used in the aqueous ink, the ink can form a recorded matter having further improved above effects and satisfactory coloring property. When a fluorescent coloring material is used as the water-soluble coloring material, the recorded matter formed with the ink on a recording medium shows much improved fluorescent intensity and density in comparison with a recorded matter formed with conventional fluorescent ink. In addition, such an ink shows excellent results when used in ink jet recording.

When one considers a system with which an aqueous ink employing a water-dispersible coloring material can express high reliability such as anti-sticking property, on the basis of various properties, it is common to study how to reduce a particle diameter of the water-dispersible coloring material or how to select a moisturizing agent which can be used in a large amount in order to prevent agglomeration of the coloring material. Furthermore, when means for improving coloring property of a recorded matter is studied, attention tends to be given to how to dissolve or disperse a coloring material in the ink uniformly and satisfactorily or how to select a coloring material having satisfactory coloring property. Usually, based on such studies (i.e., prevention of agglomeration of a coloring material), ink having satisfactory anti-sticking property and satisfactory coloring property is designed.

In contrast to the above-mentioned general approaches, the inventors of the present invention studied the condition of ink at the gas-liquid interface and the condition of ink applied on a recording material using various inks and recording materials in current use. As a result, the inventors of the present invention noted a fact that when an aqueous ink employing a water-dispersible coloring material is left standing, the coloring material begins to agglomerate owing to drying etc., and finally entirely agglomerates forming a network, thereby the ink solidifies. The inventions also found the fact that the similar agglomeration occurs in the ink applied on a recording medium. Furthermore, they paid attention to the fact that, inks more liable to cause agglomeration of water-dispersible coloring material (for example, inks containing a large amount of the water-dispersible coloring material or inks of unstable dispersibility) more readily forms agglomeration of the coloring material on the surface of the recording material. In view of the above, the inventors of the present invention have studied the apparently conflicting subjects, namely, how to form fine agglomeration of the water-dispersible coloring material in the nozzle which is easily broken, and how to efficiently produce agglomeration of the water-dispersible coloring material on the recording medium.

Further, observing the behavior of the water-dispersible coloring material in ink, the inventors noted that when the ink is evaporated and dried in a vessel such as a beaker, the water-dispersible coloring material agglomerates on the hydrophobic surface of the vessel (the interface between the ink and the vessel). This phenomenon was assumed due to the interaction of the coloring material exceeding the saturated concentration and separated out on the surface of the container (the liquid-solid interface) in order to maintain a stable condition of the water-dispersible coloring material in the ink. Unlike a hydrophobic coloring material, a water-dispersible coloring material has a water-soluble group (a sulfonic group, a carboxyl group, a phosphoric group, or the like in a free acid state). Thus, the water-dispersible coloring material does not immediately precipitate.

Based on the above, the inventors of the present invention studied the mechanism and various materials to complete the present invention.

The inventors of the present invention think the mechanism by which the ink according to the present invention shows remarkably improved reliability such as clogging resistance and anti-sticking property and provides a recorded matter of high quality or high coloring property as follows.

Figure 9:
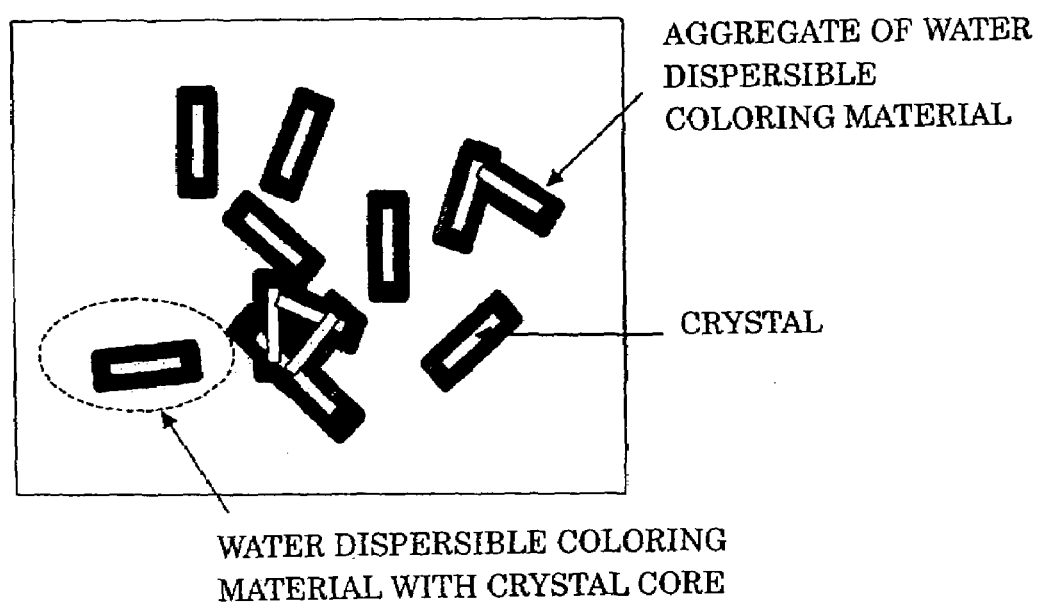
FIG. 9 is a schematic view illustrating formation of aggregates in the ink according to the present invention.

The ink according to the present invention is usually in a stable condition in which a water-dispersible coloring material, a liquid medium (an aqueous medium), and a water-soluble crystal-forming component are mixed. The water-dispersible coloring material is stably dispersed in water with a surfactant, a resin, or the like as required. When such an ink is left to stand, the water content in the ink is reduced by evaporation, and the concentration of the water-soluble crystal-forming component in the ink reaches the saturated concentration, so that the crystal-forming component begins to precipitate as crystal. At the same time, the concentration of the water-dispersible coloring material reaches the saturated concentration so that the water-dispersible coloring material is in an unstably dispersed condition and therefore tends to agglomerate. By simultaneously achieving such two conditions, specifically, a condition in which crystallization occurs in the ink and a condition in which the water-dispersible coloring material is unstable and tends to agglomerate, the water-dispersible coloring material aggregates around the crystals as a core so as to form dispersed aggregates (FIG. 9). In the ink in this condition containing aggregates of the water-dispersible coloring material formed around the crystals, formation of a network (FIG. 10) of water-dispersible coloring materials is prevented, which will occur in a conventional ink containing the water-dispersible coloring material. Since aggregates of the water-dispersible coloring material formed around the crystals hardly form such a network, the aggregates do not form tough sticking as the dispersible coloring material alone does. As a result, anti-sticking property and clogging resistance are improved. Furthermore, since the aggregates have a water-soluble core, even if clogging near the nozzle of an ink jet head occurs, the aggregates near the clogged nozzle will be easily removed by a recovery operation such as suction or pressurizing exerting external and internal action onto the aggregates.

Figure 11:
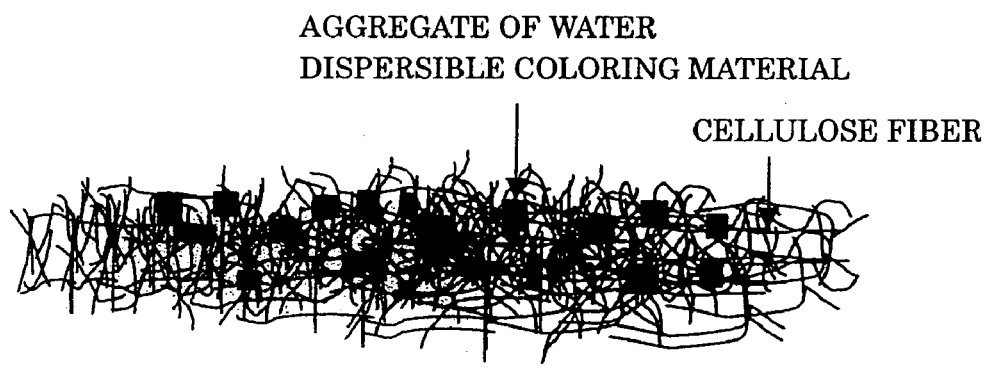
FIG. 11 is a schematic view illustrating a condition of an aggregate of a water-dispersible coloring material stuck on a recording medium.

Furthermore, on the surface of the recording medium, the water content of the ink applied onto the recording medium becomes low with evaporation and permeation into the recording medium, and the aggregates of the water-dispersible coloring material having crystalline core are formed, and at the same time, the water-dispersible coloring material strongly interacts with the constituents of the recording medium such as cellulose fiber chemically and physically (FIG. 11). As a result, image fastness such as water resistance is improved.

Figure 12:
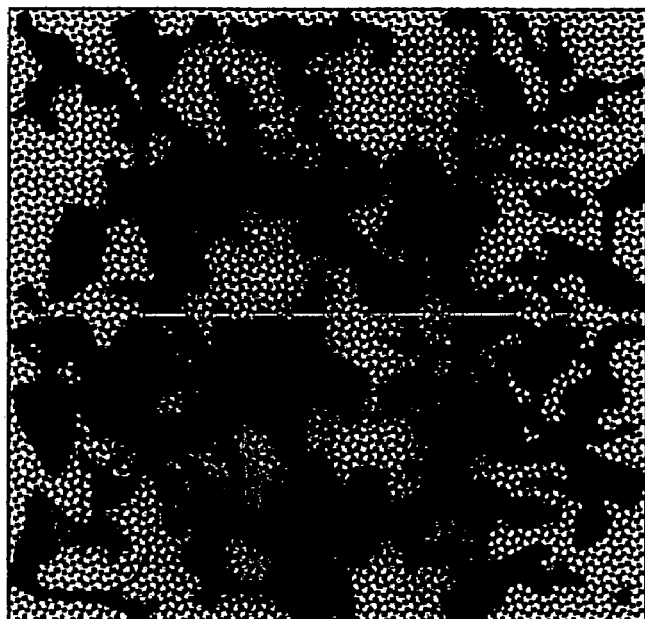
FIG. 12 is a schematic view illustrating a condition that agglomerates of a water-dispersible coloring material are formed when the water-dispersible coloring material and a water-soluble coloring material are used together.
Figure 13:
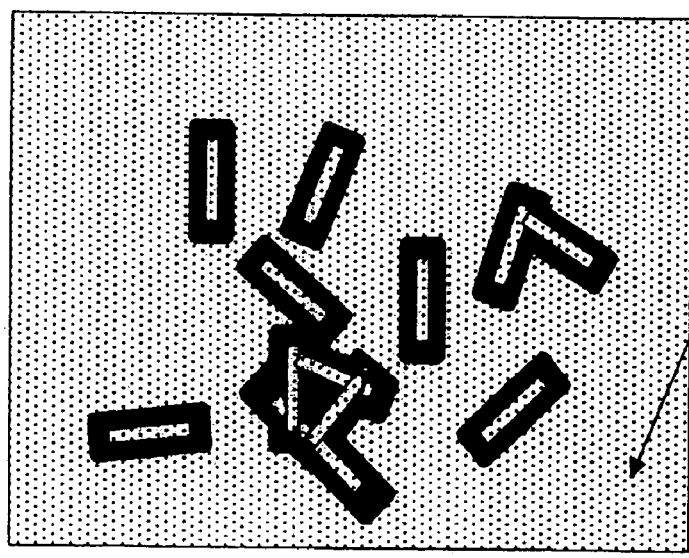
FIG. 13 is a schematic view illustrating a condition where a water-soluble coloring material having solubility higher than that of a water-dispersible coloring material is present in the solvent of ink in which aggregates of the water-dispersible coloring material formed around a crystal core.
Figure 14:
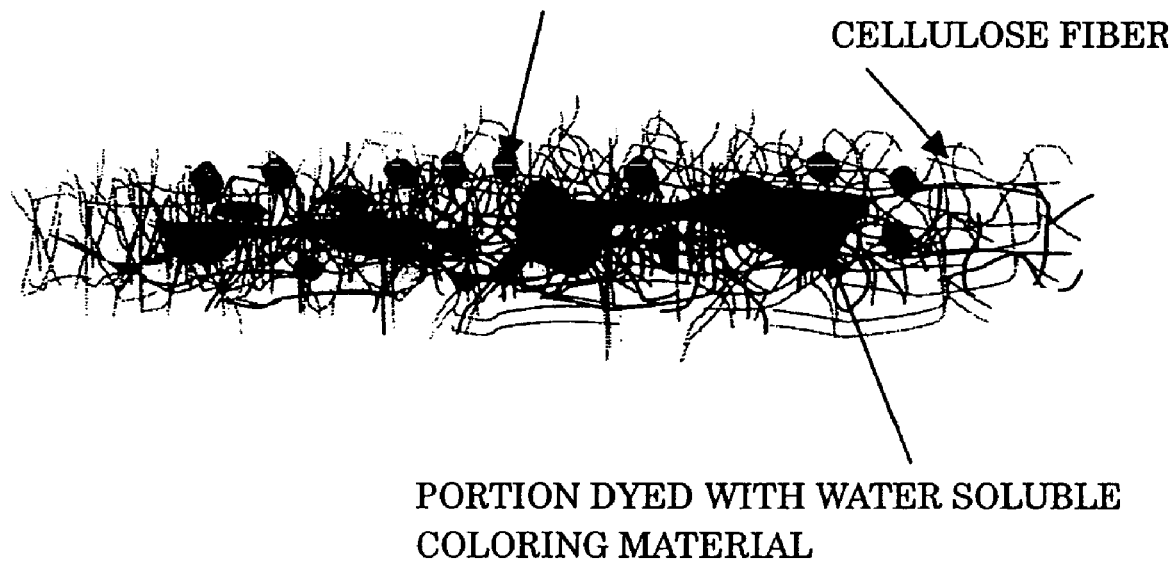
FIG. 14 is a schematic view illustrating a condition where aggregates of a water-dispersible coloring material according to the present invention are formed in the ink containing both the water-dispersible coloring material and a water-soluble coloring material.

Furthermore, the inventors of the present invention found out that when the ink of the present invention contains both a water-dispersible coloring material and a water-soluble coloring material as the coloring material of the ink, coloring property and anti-sticking property of a recorded image were further improved. The reason is considered as follows. When a conventional ink containing both a water-dispersible coloring material and a water-soluble coloring material is applied onto the recording medium and the water content of the ink is reduced and a network of the agglomerated water-dispersible coloring material is formed in the fixation process (FIG. 12). As a result, satisfactory coloring property is not obtained. However, according to the present invention, the water-dispersible coloring material aggregates around the crystals of the crystalline component. Thus a network of the water-dispersible coloring material is not formed and the water-soluble coloring material present free in the solvent phase of the ink (FIG. 14) serves for satisfactory color development. A reason for improved anti-sticking property is considered as follows. The buffering effect between the aggregates of the water-dispersible coloring material aggregated around crystals enables good conditions of the aggregates. Furthermore, when a water-soluble coloring material of which solubility is higher than that of the water-dispersible coloring material is present in a solvent of the ink, the water-dispersible coloring material satisfactorily aggregates around a crystal core owing to the difference in solubility between two coloring materials in the ink (FIG. 13). When a fluorescent coloring material is used as a water-soluble coloring material in the ink of the present invention, such an ink is especially effective for enhancing fluorescent intensity of an image. It is considered that, the fluorescent coloring material is in a monomolecular state and not taken into agglomeration of the water-dispersible coloring material in the same manner as with the above-described water-soluble coloring material, so that high fluorescent intensity is obtained. In this case, the content of the fluorescent coloring material should be smaller than that causes concentration quenching on a recording medium (for example, smaller than the content of the fluorescent coloring material that causes concentration quenching in an aqueous ink composition from which water has been removed). Here, the term "concentration quenching" means a phenomenon of decrease in fluorescent intensity with increase in the content of a fluorescent coloring material.

As described above, the ink according to the present invention contains at least an aqueous medium, a water-dispersible coloring material, and a crystal-forming component as ink components. More preferable effect, however, can be obtained when an organic solvent that dissolves the crystal-forming component is used together. When such an organic solvent is contained in the ink of the present invention, the water-dispersible coloring material easily forms an aggregate having a crystal as a core. Regarding anti-sticking property, the presence of such an organic solvent in the ink allows independent presence of aggregates of the water-dispersible coloring material in the ink. The above-described organic solvent is preferably a solvent that is not so volatile in an ordinary temperature environment, such as glycerol or triethylene glycol. Furthermore, if the organic solvent can also dissolve the water-soluble coloring material, the coloring property including fluorescent property of a recorded matter is further improved. This is because use of the above-mentioned organic solvent secures good dissolved condition of the water-soluble coloring material.

Furthermore, regarding a relationship between the organic solvent and the crystal-forming component, it is especially preferred that the content of the crystal-forming component in the ink is the saturated concentration or more with respect to the amount of the selected organic solvent in the ink, because of easy formation of aggregates of the water-dispersible coloring material around crystals of the crystal-forming component as a core. Therefore, for expression of the mechanism of the present invention, it is especially preferred that the saturated concentration of the crystal-forming component in the organic solvent is not higher than the saturated concentration thereof in water in the ink.

In addition, if the content of the crystal-forming component in the ink is not more than the saturated concentration with water in the ink and is not less than the saturated concentration with the organic solvent used in the ink, the advantage of the present invention can be further satisfactorily obtained. The reason is as follows. The crystal-forming component is satisfactorily dissolved in the ink, and crystallization of the crystal-forming component in the ink rapidly occurs as the evaporable components evaporate.

Hereinafter, more description will be made with respect to components (e.g., water) in the ink according to the present invention having an effect obtained by the above-mentioned mechanism.

Meaning of the above-mentioned "a water-dispersible coloring material forms an aggregate around a crystal of a crystal-forming component as the water content decreases in an aqueous ink" is as follows. In an ink of which water content is not decreased, ink components such as a water-dispersible coloring material and a water-soluble crystal-forming component are present together in the ink. As the water content decreases, the crystal-forming component dissolved in the ink crystallizes to be a core around which an aggregate of the water-dispersible coloring material is formed.

Also, it is preferable that the water-dispersible coloring material forms aggregates around crystals as the water content decreases 50 wt % or more owing to evaporation etc. In the present invention, it is preferred that the aggregates are maintained even if 80 wt % or more of the ink components are lost as a result of evaporation or the like. In the present invention, a more stable effect can be obtained by adjusting the content of the crystal-forming component in the liquid medium of the ink including the above-described organic solvent and the liquid medium of the ink from which water has been removed in such a manner that it is not less than the saturated concentration with respect to the organic solvent. In other words, an effect of the present invention is satisfactorily obtained when the crystal-forming component (especially preferably, ethylene urea) is contained in the ink in such a ratio that the content of the crystal-forming component is at the saturated concentration or higher in the water-soluble organic liquid medium other than water. This is understandable from comparison of examples described later.

The water-dispersible coloring material of the constituent of the present invention indicates a coloring material that does not disperse or dissolve in water by itself, but can be dispersed in water through chemical and physical functions of a compound having a water-solubilizing group such as surfactants and resins. For example, carbon black pigments such as furnace black, lamp black, acetylene black, and channel black, those having a primary particle diameter of 15 to 40 nm, a specific surface area determined by the BET method of 50 to 300 mm$^2$/g, a DBP oil absorption of 40 to 150 ml/100 g, and volatile components of 0.5 to 10%, are preferable. Further examples are water-insoluble azo pigments such as Toluidine Red, Toluidine Maroon, Hansa Yellow, Benzidine Yellow, and Pyrazolone Red; insoluble azo pigments such as Lithol Red, Helio Bordeaux, Pigment Scarlet, and Permanent Red 2B; derivatives from vat dyes such as alizarin, indanthorone, and thioindigo maroon; phthalocyanine pigments such as Phthalocyanine Blue, Phthalocyanine Green, and phthalocyanine containing gold; quinacridone pigments such as Quinacridone Red and Quinacridone Magenta; perylene pigments such as Perylene Red and Perylene Scarlet; isoindolinone pigments such as Isoindolinone Yellow, and Isoindolinone Orange; imidazolone pigments such as Benzimidazolone Yellow, Benzimidazolone Orange, and Benzimidazolone Red; pyranthrone pigments such as Pyranthrone Red and Pyranthrone Orange; thioindigo pigments; condensed azo pigments; thioindigo pigments; diketopyrrolopyrrole pigments; Flavanthrone Yellow; Acylamide Yellow; Quinophthalone Yellow; Nickel Azo Yellow; Copper Azomethine Yellow; Perynone Orange; Anthrone Orange; Dianthraquinonyl Red; and Dioxazine Violet.

Further examples of the organic pigments (represented by color index (C.I.) numbers) include C.I. Pigment Yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26. Although pigments other than the above-mentioned may be used, particularly preferable pigments are C.I. Pigment Yellow 13, 17, 55, 74, 93, 97, 98, 110, 128, 139, 147, 150, 151, 154, 155, 180, and 185; C.I. Pigment Red 122, 202, and 209; and C.I. Pigment Blue 15:3 and 15:4.

A volume average particle diameter of the above-mentioned pigment is preferably 150 nm or less. Furthermore, the content of a water-dispersible coloring material in the ink is preferably 0.1 to less than 10% by mass, more preferably 0.2 to less than 8% by mass, and most preferably 0.3 to less than 2% by mass in order to improve the image density and to preferably adjust the amount of the water-dispersible coloring material not included in the aggregates formed around crystal cores, but not limited thereto. Furthermore, the water-dispersible coloring material can be used alone or two or more kinds thereof can be used in combination.

A dispersing agent for dispersing such coloring materials in the ink is not specifically limited so long as the agent is water-soluble and has a function of dispersing a pigment. Examples of the dispersing agent include: a resin such as a styrene-acrylic acid random or block copolymer or a styrene-maleic acid random or block copolymer; and a nonionic surfactant or an anionic surfactant which is capable of producing a dispersed condition in water by use of a micelle condition or an emulsion condition. Specific examples include a block copolymer, a random copolymer, a graft copolymer, and a salt thereof obtained from at least two monomers (at least one of which is a hydrophilic monomer) selected from styrene, styrene derivatives, vinylnaphthalene, vinylnaphthalene derivatives, an aliphatic alcohol ester of α,β-ethylenic unsaturated carboxylic acid, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acrylamide and derivatives thereof, and the like. Of these, an especially preferred dispersing agent for practice of the present invention is a block copolymer. This is because a water-dispersible coloring material obtained from a block copolymer has little unevenness between the respective coloring materials and therefore easily provides stable ink.

A block copolymer may have a structure represented by, for example, AB, BAB, or ABC. A block copolymer having a hydrophobic block and a hydrophilic block and having a balanced block size that contributes to dispersion stability is especially advantageous for practice of the present invention. A functional group can be incorporated into a hydrophobic block (a block to which the pigment binds), thereby further enhancing a specific interaction between the dispersing agent and the pigment to improve dispersion stability. Furthermore, a weight average molecular weight of the polymer is less than 30,000, preferably less than 20,000, and more preferably 2,000 to 10,000.

In addition, the methods of producing the polymers are disclosed in Japanese Patent Application Laid-Open Nos. H05-179183, H06-136311, H07-053841, H10-87768, H11-043639, H11-236502, and H11-269418.

Examples of the typical hydrophobic monomers which can be used for block copolymers include, but are not limited to, the following monomers: benzyl acrylate, benzyl methacrylate, methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxylethyl methacrylate (HEMA), hydroxypropyl methacrylate, 2-ethoxyethyl methacrylate, methacrylonitrile, 2-trimethyl siloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylayte, 2-phenylethyl methacrylate, hydroxyethyl acrylate, hydroxypropyl acrylate, acrylonitrile, 2-trimethyl siloxyethyl acrylate, glycidyl acrylate, p-tolyl acrylate, and sorbyl acrylate. Preferred hydrophobic monomers are benzyl acrylate, benzyl methacrylate, 2-phenylethyl methacrylate, methyl methacrylate, butyl methacrylate, and 2-ethylhexyl methacrylate. Preferably, a block copolymer is produced by use of a homopolymer and a copolymer produced from the above compounds (e.g., a copolymer of methyl methacrylate and butyl methacrylate).

Examples of the typical hydrophilic monomers which can be used for block copolymers include, but are not limited to, the following monomers: methacrylic acid (MAA), acrylic acid, dimethylaminoethyl methacrylate (DMAEMA), diethylaminoethyl methacrylate, tert-butylaminoethyl methacrylate, dimethylaminoethyl acrylate, diethylaminoethyl acrylate, dimethylaminopropyl methacrylamide, methacrylamide, acrylamide, and dimethylacrylamide. Preferably, a block copolymer is produced by use of a homopolymer or a copolymer of methacrylic acid, acrylic acid, or dimethylaminoethyl methacrylate.

A polymer containing an acid is directly produced, or produced from a blocked monomer having a blocking group to be removed after polymerization. Examples of a blocked monomer that generates acrylic acid or methacrylic acid after removal of blocking groups include trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

Especially, in considering long-term stability of the ink under various environments or a satisfactory effect of the present invention, a dispersing agent using a resin is preferred and a dispersing agent using a block copolymer resin is especially preferred.

A resinous dispersing agent can be used alone or two or more kinds thereof can be used in combination if necessary. A content of the resin dispersing agent in the ink is 0.5 to 10% by mass, preferably 0.8 to 8% by mass, and more preferably 1 to 6% by mass. If the content of the dispersing agent is more than the range, it may be difficult to maintain desired viscosity of the ink.

The crystal-forming substance to be incorporated in the ink according to the present invention is a water-soluble substance that is solid as a simple substance in ordinary temperature environments and forms needle or spherical crystals. When the water content of an aqueous solution of such a substance is decreased by heating or the like, recrystallization will occur. Examples of such a substance include urea, ethylene urea, ε-caprolactone, succinimide, thiourea, dimethylolurea, and 2-pyrrolidone. These compounds may be substituted with at least a substituent selected from an ethylene oxide group, a propylene oxide group, and an alkyl group. Those compounds preferably have a ring structure in view of stability of the crystalline component in the ink. The crystal-forming component can be used alone or two or more kinds thereof can be used in combination if necessary. The crystalline component being solid in ordinary temperature environments enables the effect of the present invention by precipitation. The above-mentioned term "ordinary temperature environments" means the range of 20° C. to 25° C., but in view of operability, the melting point of a crystal-forming component which is solid in ordinary temperature environments is 30° C. or more, preferably 60° C. or more, and more preferably 120° C. or more. Although a content of the crystal-forming component in the ink can be appropriately selected in accordance with the type of a recording medium, the content is preferably 1 to 30% by mass and more preferably 2 to 20% by mass based on the entire mass of the ink. If the content is too small, the effect of the present invention cannot be obtained. If the content is too large, discharging property is negatively affected when the ink is used for ink jet recording.

When a water-soluble coloring material is used together for the ink of the present invention, such a material means one having, in its structure, a water-soluble group such as a sulfonic group, a carboxyl group, a phosphoric group, a hydroxyl group, or an amino group in a free acid state, and being stable in water without any assistance of a second component such as a surfactant or a resin. Examples of such a material include a direct dye, an acid dye, a basic dye, and a vat dye. Specific examples of the dye include C.I. Direct Black 168, C.I. Direct Black 154, C.I. Direct Yellow 142, C.I. Direct Yellow 86, C.I. Direct Red 227, C.I. Direct Blue 199, C.I. Direct Yellow 142, C.I. Direct Black 195, and Food Black 1 and 2. However, the coloring material is not limited to those materials. The water-soluble coloring material can also be used alone or two or more kinds thereof can be used in combination if necessary.

Although an amount of the above-mentioned water-soluble coloring material to be used is not specifically limited, the amount is generally preferably 0.1 to 15% by mass and more preferably 0.1 to 10% by mass based on the entire mass of the ink.

Furthermore, the function and effect of the present invention is expressed at the highest level with concomitant use of a water-soluble fluorescent dye. When the ink according to the present invention is used as ink for providing a fluorescent color, it is possible to improve fluorescent intensity, density, and fastness of the image, which has been difficult to achieve.

As a fluorescent compound or fluorescent coloring material which is used as a component of the ink of the present invention, one having the following atomic group in its structure is especially preferred.

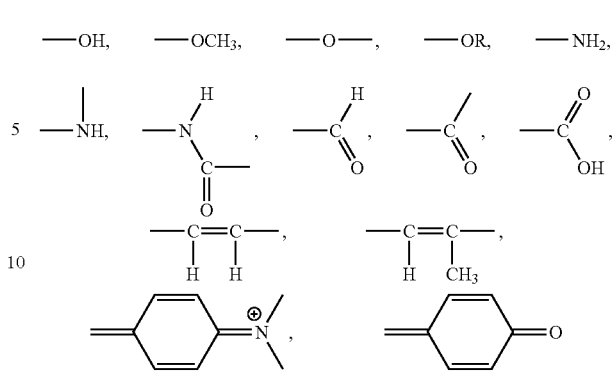

Furthermore, one having a xanthene structure such as C.I. Acid Red 52, C.I. Acid Red 92, C.I. Acid Red 289, or C.I. Acid Yellow 73, one having a pyranine structure such as Solvent Green 7, one having a coumarin structure such as C.I. Acid Yellow 184, a direct dye having fluorescent property, or a water-soluble fluorescent dye having the following structure and a water solubilized derivative thereof has a capability of providing the highest function and effect of the present invention.

TABLE 1-1

| Name of dye | Structure | Color under daylight | Fluorescent color |
|---|---|---|---|
| Brilliantsulfoflavine FF (C.I.56205) | | Yellow | Green to yellowish green |
| Basic yellow HG (C.I.46040) | | Yellow | Greenish yellow to yellow |
| Eosine (C.I.45380) | | Red | Yellow to orange |

TABLE 1-1-continued

| Name of dye | Structure | Color under daylight | Fluorescent color |
|---|---|---|---|
| Rhodamine 6G (C.I.45160) | | Red | Yellow to orange |
| Rhodamine B (C.I.45170) | | Pink | Orange to red |

TABLE 1-2

| Name of pigment | Structure |
|---|---|
| Lumogen L Yellow | |
| Lumogen L Brilliant Yellow | |
| Lumogen L Yellow Orange | |
| Lumogen L Red Orange | |

As a fluorescent compound, a fluorescent whitening agent etc., in general use can also be used.

For example, the content of the fluorescent dye in the ink is preferably 0.01 to 30% by mass and more preferably 0.05 to 20% by mass based on the entire mass of the ink. When a recorded matter requires fluorescent property, the content of the fluorescent dye is preferably one that does not cause concentration quenching (a phenomenon that fluorescent intensity is reduced when the content of the fluorescent dye in the ink exceeds a certain value) when recording is performed by applying the ink of the present invention on a recording medium. When prime importance is placed on improvement of fluorescent property, the content is especially preferably 3% by mass or less. However, the content is not limited to those ranges in consideration of properties of a recording medium and a fluorescent coloring material.

As the liquid medium to contain a component such as a dispersion coloring material, a mixture of water and a water-soluble organic solvent is preferred. Examples of the water-soluble organic solvent include: amides such as dimethylformamide and dimethylacetamide; ketones such as acetone; ethers such as tetrahydrofuran and dioxane; polyalkylene glycols such as polyethylene glycol and polypropylene glycol; alkylene glycols each with an alkylene group having 2 to 6 carbon atoms such as ethylene glycol, propylene glycol, butylene glycol, triethylene glycol, 1,2,6-hexanetriol, thiodiglycol, hexylene glycol, and diethylene glycol; glycerin; lower alkyl ethers of polyhydricalcohols such as ethyleneglycol monomethyl (or ethyl) ether, diethyleneglycol monomethyl (or ethyl) ether, and triethyleneglycol monomethyl (or ethyl) ether; cyclic amide compounds such as N-methyl-2-pyrrolidone, 1,3-dimethyl-2-imidazolidinone, triethanolamine, sulfolane, dimethyl sulfoxide, 2-pyrrolidone, and ε-caprolactam; and imide compounds such as succinimide. The above compounds can be used singly, or optionally in combination of two or more compounds.

The water-soluble organic solvent is an organic solvent that functions as a solvent for the above-mentioned crystal-forming component is preferably used in order to more effectively realize the object of the invention. As already described, the ink of the present invention containing such an organic solvent allows easy formation of aggregates of the water-dispersible coloring material around crystal cores and improves anti-sticking property, because aggregates can be present independently in the ink containing the organic solvent for effective expression of the aggregates of the water-dispersible coloring material. Preferred examples of the solvent include one having a hydroxyl group as a hydrophilic group such as sugar alcohol or glycol. A solvent having no polar group is preferred, but it does not matter much as long as it is used with another organic solvent having no polar group as a main solvent. More preferably, the solvent has a vapor-pressure temperature of 250° C. or more in ordinary atmospheric environments.

Generally, the content of the above-mentioned water-soluble organic solvent is preferably 1 to 40% by mass and more preferably 3 to 30% by mass based on the entire mass of the ink.

Furthermore, the water content in ink is preferably selected from the range of 30 to 95% by mass. If the water content is less than 30% by mass, solubility of a water-soluble component may not be sufficient enough and viscosity of the ink becomes large. In contrast, if the water content is more than 95% by mass, the amount of the evaporating component becomes too large. Thus, sufficient anti-sticking property may not be obtained.

A surfactant may be used as a component of the ink according to the present invention. A preferred surfactant is a nonionic surfactant having no polarity. It is preferred that an aqueous solution of the nonionic surfactant undergoes no phase-separation. A nonionic surfactant that phase-separates in an aqueous solution is not preferred because the resultant ink is not stable. This means that it is preferable to use a surfactant that is dissolved or apparently uniformly dispersed in water, especially, a nonionic surfactant forming an emulsion in an aqueous solution. Furthermore, it was found out that the amount of the nonionic surfactant in the ink is preferably not larger than the critical amount to maintain emulsion state in an aqueous solution, in view of stability of the ink.

A nonionic surfactant preferably used for the present invention is one having HLB of 13 or less. Generally, if HLB is more than 13, water solubility becomes large and the surfactant tends to exhibit solvent properties. As a result, crystallization is negatively affected to interfere expression of the mechanism of the present invention.

Specifically, the content of the nonionic surfactant in the ink according to the present invention is preferably 1% by mass or more, and more preferably 1 to 20% by mass based on the entire mass of the ink. If the content is less than 1% by mass, desired permeability or spreading property of the ink cannot be obtained in some cases of image formation. If the content is more than 20% by mass, a desired balance in printing quality (for example, a satisfactory balance of various properties including image density, fixation property, and feathering (hairy bleeding) prevention) may not be obtained.

As an especially preferred surfactant to serve as a component of the ink according to the present invention among nonionic surfactants satisfying the above-mentioned requirements, a compound represented by Formula (I) as indicated below and compounds (II) to (VII) as indicated below are exemplified.

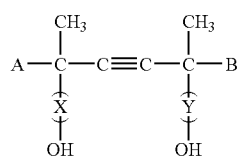
(I)

(In Formula (I) indicated above, A and B are independently $C_nH_{2n-1}$ (n is an integer of 1 to 10) and X and Y respectively a ring-opened ethylene oxide unit and/or a ring-opened propylene oxide unit.)

1,5-sorbitan ester (II)

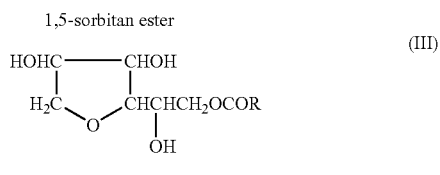
1,4-sorbitan ester (III)

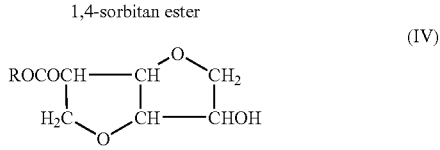
Sorbide ester (IV)

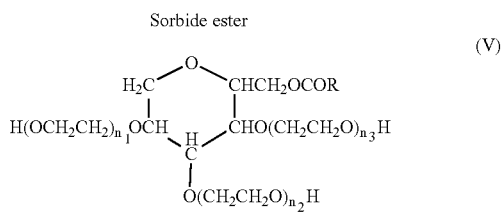
(V)

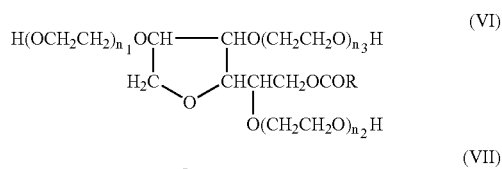
(VI)

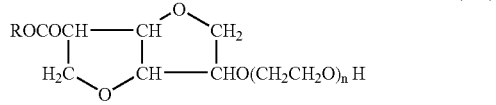
(VII)

R: alkyl group of fatty acid

Furthermore, an especially preferred surfactant among the nonionic surfactants represented by Formula (I) is a compound represented by the following formula (VIII):

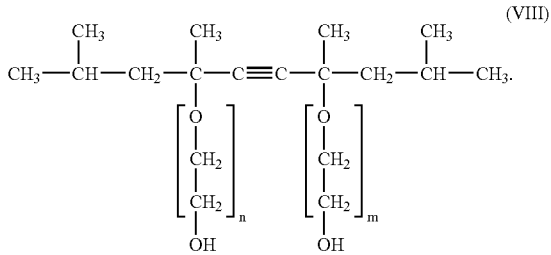
(VIII)

m and n are integers

Furthermore, in view of stability of the ink, a monohydric alcohol is preferably used together in the ink according to the present invention. The monohydric alcohol prevents development and proliferation of microbes such as mold which may affect clogging or the like. Furthermore, since the monohydric alcohol has a satisfactory effect for evaporation or permeation into a recording medium when the ink is applied onto the recording medium, the alcohol is effective for further satisfactorily providing an effect of the present invention. A content of the monohydric alcohol in the ink according to the present invention is 0.1 to 20% by mass and preferably 0.5 to 10% by mass based on the entire mass of the ink. Specific examples of the monohydric alcohol usable as an ink component for the present invention include ethanol, isopropyl alcohol, and n-butanol. These can be used alone or two or more thereof can be used in combination if necessary.

The ink according to the present invention may additionally contain various additives such as a water-soluble organic solvent, a surfactant, an anti-corrosive agent, an antiseptics, an anti mold agent, an anti-oxidant, an antireductant, an evaporation accelerator, a chelator, a water-soluble polymer, and a pH regulator, if necessary.

The ink according to the present invention preferably has a surface tension of 40 dyne/cm or less. This is because, for the mechanism of the present invention as described above, it is effective that a droplet spreads to a certain area after recording. Furthermore, a pH of the ink according to the present invention is preferably 6.5 or more in view of stability of the ink.

Furthermore, according to the ink of the present invention, it is preferred that plural alkali metal ions be used together as counter ions to the coloring material. When the ink is used for ink jet recording, stability and discharging property of the ink are improved if the coloring material and the counter ions thereof are used together. Examples of the alkali metal ions include $Li^+$, $Na^+$, and $K^+$.

Although the aqueous ink according to the present invention having the above-mentioned constitution can be used as ink for general stationery, the aqueous ink is especially advantageous when used for ink jet recording. As ink jet recording methods, a recording method which includes applying mechanical energy to ink to discharge a droplet, and an ink jet recording method which includes applying heat energy to ink and discharging a droplet by foaming of the ink are exemplified. The ink of the present invention is especially preferably applicable to the ink jet recording method discharging the ink by a foaming phenomenon of the ink due to heat energy, and has characteristics in that the discharge is extremely stable and that a satellite dot or the like is not caused. However, in this case, adjustment of thermal properties (for example, specific heat, coefficient of thermal expansion, and heat conductivity) may be required.

In addition, the ink according to the present invention is desirably prepared to have a surface tension of 30 to 40 dyne/cm and a viscosity of 15 cP or less, preferably 10 cP or less, and more preferably 5 cP or less at 25° C. as physical properties of ink itself, in order to solve the problem of water resistance of ink on the printed recorded matter when recording is performed on plain paper or the like, and at the same time to improve a matching with a head for ink jet recording. Accordingly, in order to prepare ink having the above-mentioned physical properties and to solve the problems in plain paper, a water content in the ink according to the present invention is 50% by mass or more and 98% by mass or less, and preferably 60% by mass or more and 95% by mass or less.

Examples of preferred method and apparatus for recording by use of the ink according to the present invention includes a method and an apparatus which includes: applying heat energy corresponding to a recording signal to the ink in a chamber of a recording head; and producing a droplet by means of the heat energy.

Figure 2:
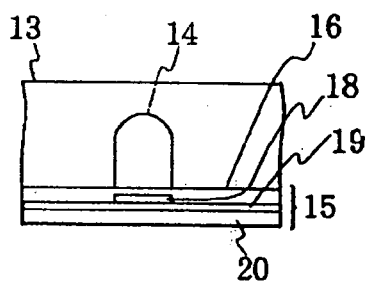
FIG. 2 is a cross sectional view in a longitudinal direction of a head of an ink jet recording apparatus.
Figure 3:
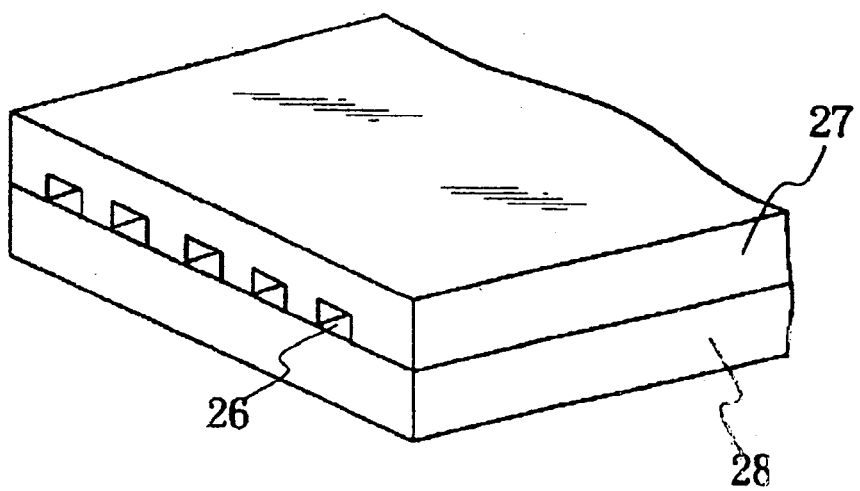
FIG. 3 is an external perspective view of a multi-head obtained from a head as shown in FIG. 1.

Initially, an example of a configuration of a head which is a principal component of such an apparatus is shown in FIGS. 1, 2, and 3. FIG. 1 is a cross sectional view of a head 13 taken along an ink flow path. FIG. 2 is a cross sectional view taken along the 2-2 line of FIG. 1. The head 13 is obtained by bonding a plate of glass, ceramics, or plastic having a groove 14 through which the ink passes and a thermal head 15. Although a thin film head is exemplified in FIG. 1, the thermal head is not limited thereto. The thermal head 15 includes: a protection film 16 made of silicon oxide or the like; aluminum electrodes 17-1 and 17-2; a heat generating resistor layer 18 made of nichrome or the like; a heat storage layer 19; and a substrate 20 made of alumina or the like and adapted to emit heat.

The ink 21 is made to reach a discharge orifice (microhole) 22 and a meniscus 23 is formed by a pressure of the ink 21. As electric signal information is applied to the aluminum electrodes 17-1 and 17-2, the thermal head 15 abruptly generates heat from a region indicated by the character n so that a part of the ink that is in contact with this region produces a bubble to push forward the meniscus 23 under a pressure of the bubble, and eventually discharge the ink 21 as a fine ink droplet 24, which is ejected from the discharge orifice 22 toward a recording medium 25.

FIG. 3 is an external perspective view of a multi-head prepared by arranging a number of heads having a configuration as shown in FIG. 1. The multi-head is prepared by tightly bonding a glass plate 27 having multiple grooves 26, and a thermal head 28 similar to that described above by referring to FIG. 1.

Hereinafter, the detailed description will be made with respect to a specific example of the above-mentioned liquid ejection head which can be installed in an ink jet printer used in the present invention.

Figure 4:
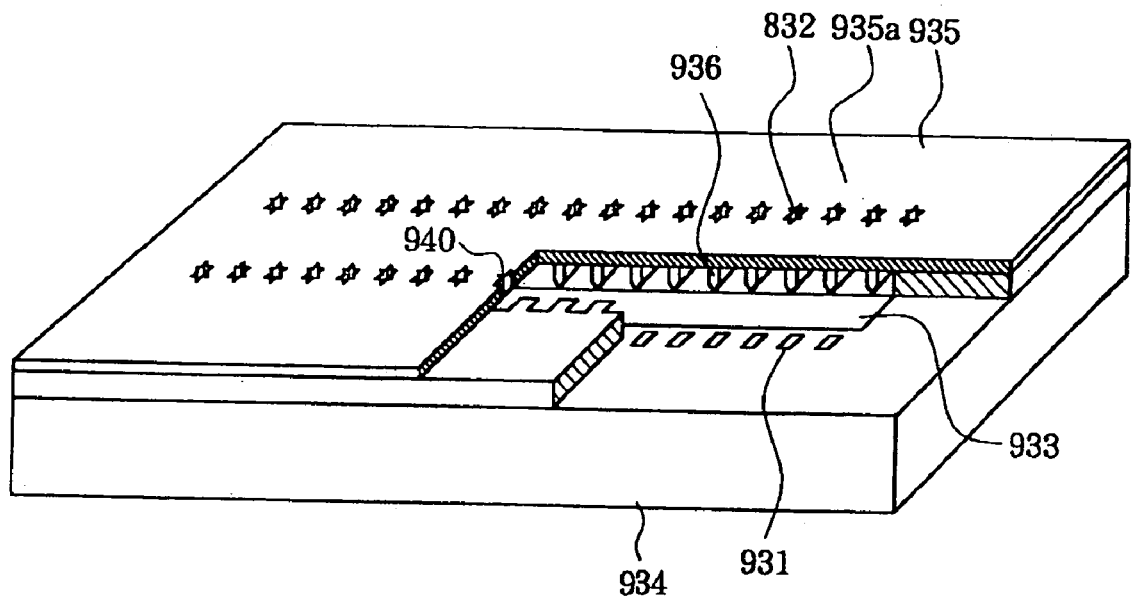
FIG. 4 is a schematic perspective view of a main part of a liquid ejection head.
Figure 5:
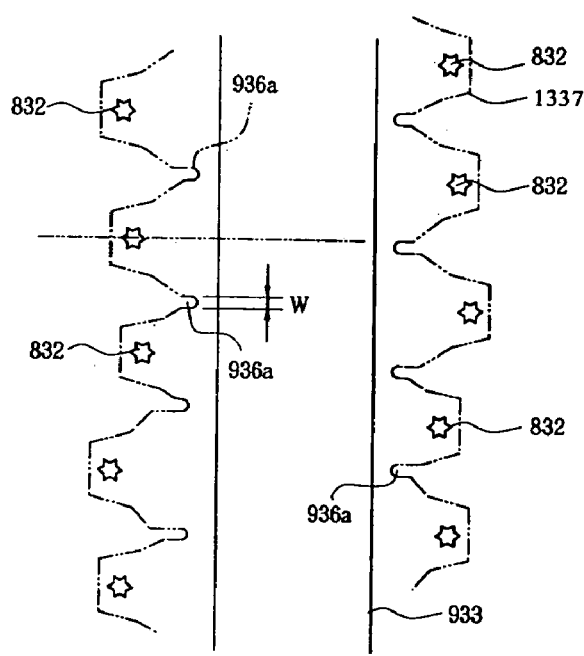
FIG. 5 is a conceptual view of a part of a liquid ejection head.
Figure 6:
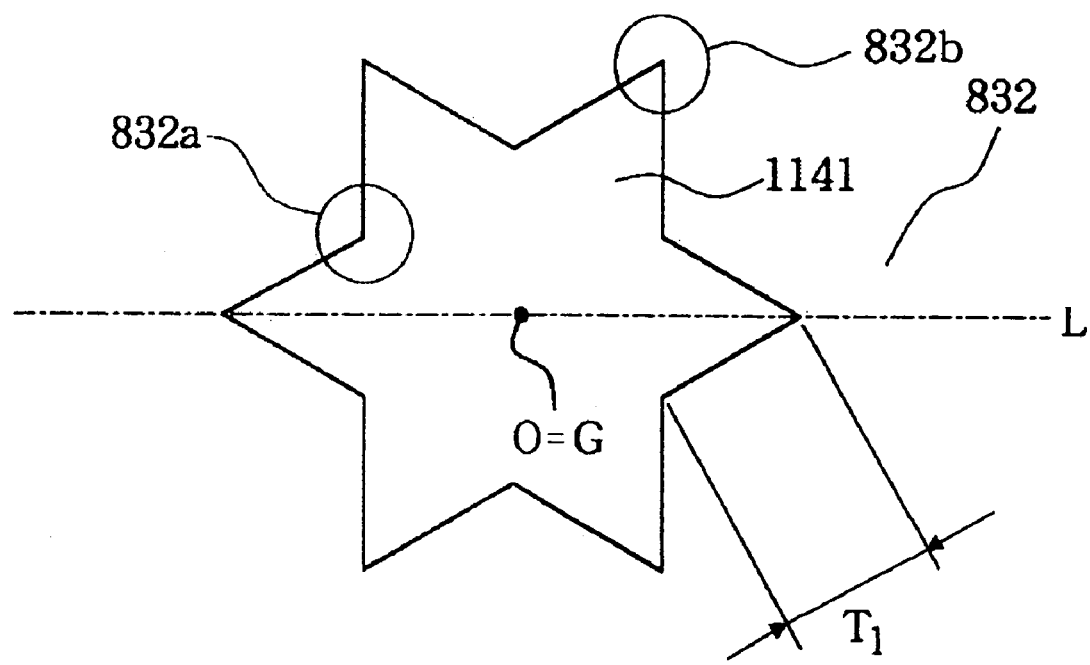
FIG. 6 is an enlarged view of an ejection orifice shown in FIG. 5.
Figure 7:
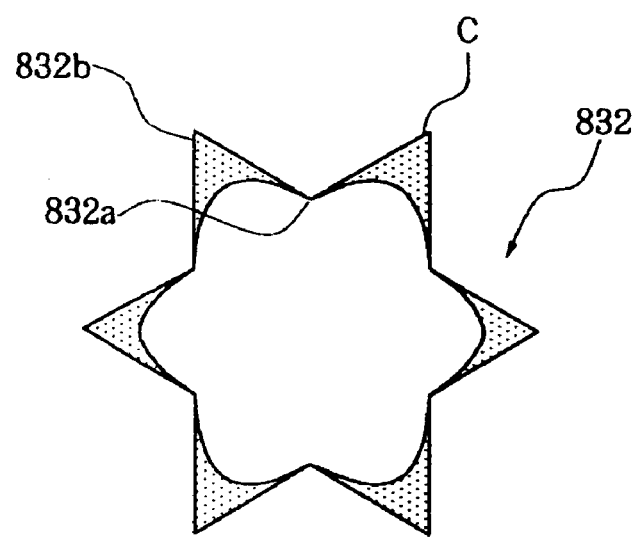
FIG. 7 is a schematic view illustrating a condition of ink stuck to an ejection orifice as shown in FIG. 6.

FIG. 4 is a schematic perspective view of a principal part of a liquid ejection head preferably used for an ink jet recording apparatus according to the present invention. FIGS. 5 to 7 are front views each illustrating a shape of an ejection orifice of the liquid ejection head as shown in FIG. 4. In those figures, an electrical wiring for driving an electrothermal converting element or the like is omitted.

In a liquid ejection head of the present example, a substrate 934 made of glass, ceramics, plastic, metal, or the like as shown in FIG. 4 is used, for example. A material of such a substrate is not the essence of the present invention and the material is not specifically limited so long as the material functions as a part of a flow path forming member and has a capability of functioning as a support of an ink discharge energy generating element and a material layer forming a liquid flow path and an ejection orifice described later. Therefore, in the present invention, description will be made with respect to the case of using a substrate of Si (a wafer). An ink ejection orifice is formed on the substrate 934. Examples of a method of forming the ejection orifice include a forming method using laser light and a method which includes: making an orifice plate (an ejection orifice plate) 935 of a photosensitive resin; and forming the ejection orifice by use of an exposing apparatus such as Mirror Projection Aliner (MPA).

In FIG. 4, reference numeral 934 denotes a substrate having an electrothermal converting element (hereinafter, also referred to as a heater in some cases) 931 and an ink supplying port 933 defined by a through hole having a slender groove shape as a common liquid chamber portion. A line of heaters 931 as heat energy generating means is arranged at an electrothermal converting element interval of, for example, 300 dpi on each side of the ink supplying port 933 in a longitudinal direction so that the respective lines together with each other form a zigzag pattern. Furthermore, an ink flow path wall 936 for forming an ink flow path is formed on the substrate 934. Furthermore, an ejection orifice plate 935 having an ejection orifice 832 is provided on the ink flow path wall 936.

In FIG. 4, the ink flow path wall 936 and the ejection orifice plate 935 are shown as separate components. However, it is also possible to simultaneously form the ink flow path wall 936 and the ejection orifice plate 935 as an integrated component by forming the ink flow path wall 936 on the substrate 934 by a technique such as spin coating. In the present example, the ejection orifice surface (upper surface) side 935a of the plate is subjected to a water repellent treatment.

Figure 8:
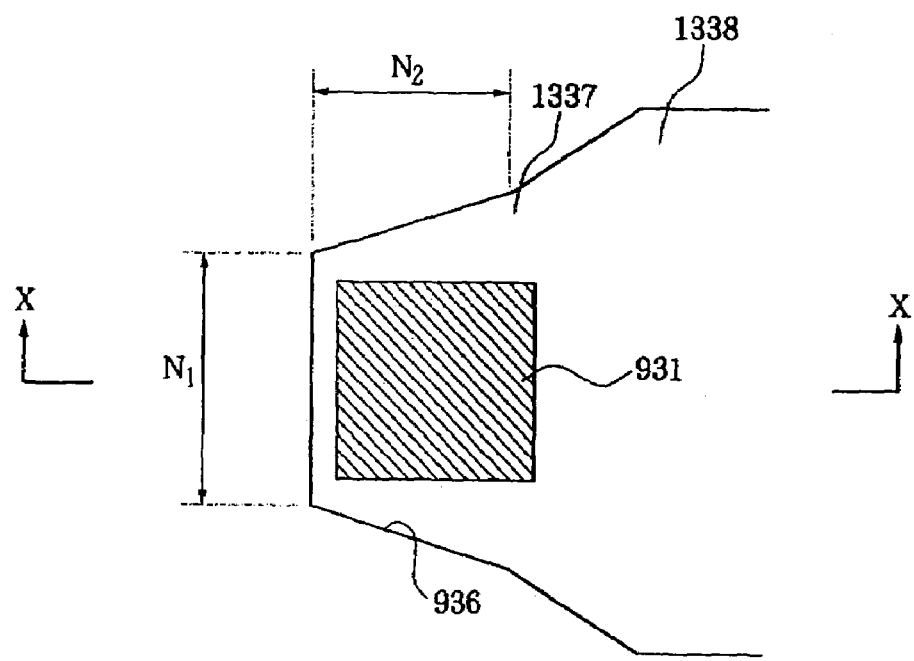
FIG. 8 is a schematic view of main portions in FIG. 5.

Furthermore, as an example of an actual size of the head, a partition wall 936a that hydrodynamically isolates adjacent nozzles as shown in FIG. 5 has a width w of 14 μm. As shown in FIG. 8, a bubbling chamber 1337 formed by the ink flow path wall 936 has $N_1$ (a width size of the bubbling chamber) of 33 μm and $N_2$ (a length size of the bubbling chamber) of 35 μm. The heater 931 has a length of 30 μm and a width of 30 μm and a resistivity of 53 Ω. A drive voltage thereof is 10.3 V. Furthermore, an ink flow path wall 936 and a partition wall 936a having a height of 12 μm and an ejection orifice plate having thickness of 11 μm can be used.

As shown in FIG. 4, among cross sections of an ejection orifice portion 940 including an ejection orifice 832 and formed in the ejection orifice plate, a cross section taken along a direction crossing an ink discharge direction (a thickness direction of the orifice plate 935) has substantially a star shape as shown in FIG. 6. The star shape includes six protruding portions 832a respectively having an edge of obtuse angle and six dented portions 832b alternately arranged between the protruding portions 832a and respectively having an edge of acute angle. In other words, six grooves are formed along a thickness direction of the orifice plate (a liquid ejection direction) as shown in FIG. 4, with the dented portion 832b which is a located far from the center O of the ejection orifice serving as a top portion of the groove and with the protruding portion 832a adjacent to the dented portion and located close to the center O of the ejection orifice serving as a base portion of the groove.

In the liquid ejection head exemplified in the figures, a cross section of the ejection orifice portion 940 taken along a direction crossing a thickness direction thereof has a shape obtained by overlapping two equilateral triangles having a side of 27 μm while the respective triangles are relatively rotated by 60 degrees. Accordingly, T1 shown in FIG. 6 is 8 μm. Angles of all protruding portions 832a are respectively 120 degrees and angles of all dented portions 832b are respectively 60 degrees.

Accordingly, the center O of the ejection orifice coincides with the center of gravity G of a polygon formed by connecting the center portions of the adjacent grooves (i.e., the center (of gravity) of a figure obtained by connecting the top portion of the groove and two base portions adjacent thereto) (see FIG. 6). An aperture size of the ejection orifice 832 of the present example is 400 μm$^2$ and an aperture size of the groove portion (an area of the figure obtained by connecting the top portion of the groove and two base portions adjacent thereto) is approximately 33 μm$^2$ per one groove portion.

FIG. 7 is a schematic view illustrating a state where ink is stuck to the ejection orifice shown in FIG. 6.

Furthermore, it is preferred that recovery means, preliminary auxiliary means, or the like for the recording head be added to the configuration of an ink jet recording apparatus according to the present invention so that the effects of the present invention can be attained in a more stable manner. Specific examples of such means include capping means, cleaning means, pressurizing or suction means, preliminary heating means such as an electrothermal conversion member, another heating element, or the combination thereof, which are provided for the recording head. It is also effective for stable recording to perform a preliminary discharge mode in which discharge which is separate from recording is performed.

EXAMPLES

Hereinafter, the present invention will be described in more detail by showing examples and comparative examples. Unless indicated otherwise, a part(s) and a percent(s) in Examples are based on mass.

Examples 1 to 13 and Comparative Examples 1 to 9

Production Example 1

Initially, an AB type block copolymer having an acid value of 250 and a number average molecular weight of 3,000 was produced by a conventional method using benzyl methacrylate and methacrylic acid as raw materials. The obtained block copolymer was neutralized with a potassium hydroxide aqueous solution and diluted with ion-exchanged water to prepare a homogeneous 50% aqueous solution of the polymer. 180 g of the polymer solution, 100 g of C.I. Pigment Blue 15:3, and 220 g of ion-exchanged water were mixed, and the mixture was mechanically stirred for 0.5 hour. Then, by using a microfluidizer, the mixture was treated by passing through an interaction chamber five times under a fluid pressure of approximately 10,000 psi (approximately 70 MPa) to obtain a dispersion. Then the dispersion was subjected to a centrifugation treatment (at 12,000 rpm for 20 minutes) to remove non-dispersed materials including a coarse particle, thereby obtaining Dispersion 1. The thus-obtained Dispersion 1 had a pigment concentration of 10% by mass and a dispersing agent concentration of 10% by mass.

Production Example 2

100 g of the polymer solution used in Dispersion 1, 100 g of C.I. Pigment Red 122, and 300 g of ion-exchanged water were mixed, and the mixture was mechanically stirred for 0.5 hour. Then, by using a microfluidizer, the mixture was treated by passing through an interaction chamber five times under a fluid pressure of approximately 10,000 psi (approximately 70 MPa) to obtain a dispersion. Then the dispersion was subjected to a centrifugation treatment (at 12,000 rpm for 20 minutes) to remove non-dispersed materials including coarse particles, thereby obtaining Dispersion 1. The thus-obtained Dispersion 2 had a pigment concentration of 10% and a dispersing agent concentration of 5%.

Production Example 3

Initially, an AB type block polymer having an acid value of 300 and a number average molecular weight of 4,000 was produced by a conventional method using benzyl acrylate and methacrylic acid as raw materials. Subsequently, the obtained block polymer was neutralized with a potassium hydroxide aqueous solution and was diluted with ion-exchanged water to prepare a homogeneous 50% aqueous solution of the polymer. 110 g of the polymer solution, 100 g of C.I. Pigment Yellow 128, and 290 g of ion-exchanged water were mixed, and the mixture was mechanically stirred for 0.5 hour. Then, by using a microfluidizer, the mixture was treated by passing through an interaction chamber five times under a fluid pressure of approximately 10,000 psi (approximately 70 MPa) to obtain a dispersion. Then the dispersion was subjected to a centrifugation treatment (at 12,000 rpm for 20 minutes) to remove coarse particles, thereby obtaining Dispersion 3. The thus-obtained Dispersion 3 had a pigment concentration of 10% and a dispersing agent concentration of 6%.

Production Example 4

Initially, an ABC type block polymer having an acid value of 350 and a number average molecular weight of 5,000 was produced by a conventional method using benzyl methacrylate, methacrylic acid, and ethoxyethylene glycol methacrylate as raw materials. Subsequently, the obtained block copolymer was neutralized with a potassium hydroxide aqueous solution and was diluted with ion-exchanged water to prepare a homogeneous 50% aqueous solution of the polymer. 60 g of the polymer solution, 100 g of carbon black, and 340 g of ion-exchanged water were mixed, and the mixture was mechanically stirred for 0.5 hour. Then, by using a microfluidizer, the mixture was treated by passing through an interaction chamber five times under a fluid pressure of approximately 10,000 psi (approximately 70 MPa) to obtain a dispersion. Then the dispersion was subjected to a centrifugation treatment (at 12,000 rpm for 20 minutes) to remove coarse particles, thereby obtaining Dispersion 4. The thus-obtained Dispersion 4 had a pigment concentration of 10% and a dispersing agent concentration of 3.5%.

Components as indicated below were mixed together and sufficiently agitated to be dissolved and/or dispersed. Then, the mixture was subjected to a filtration under pressure using Fluoro Pore Filter (trade name; manufactured by Sumitomo Electric Industries, Ltd.) to prepare ink of each of Examples and Comparative Examples.

(1) Ink Composition of Example 1

Dispersion 2: 6.7%

Dispersion 3: 3.1%

Glycerin: 5%

Ethylene urea (water-soluble crystalline component): 7%

Isopropyl alcohol: 4%

Pure water: 74.2%

(2) Ink Composition of Example 2

Dispersion 2: 7%

C.I. Direct Violet 107: 0.5%

Glycerin: 5%

Ethylene urea (water-soluble crystalline component): 7%

Surfynol 465 (manufactured by Air Products): 1%

Pure water: 79.5%

(3) Ink Composition of Example 3

Dispersion 1: 1%

Glycerin: 7%

Succinimide (water-soluble crystalline component): 7%

Ethanol: 1%

Pure water: 84%

(4) Ink Composition of Example 4

Dispersion 2: 10%

Ethylene glycol: 0.7%

Diethylene glycol: 7%

Urea (water-soluble crystalline component): 9%

Surfynol 465 (manufactured by Air Products): 1%

Pure water: 66%

(5) Ink Composition of Example 5

Dispersion 4: 11%

Glycerin: 7%

Ethylene glycol: 7%

Ethylene urea (water-soluble crystalline component): 9%

Surfynol 4.65 (manufactured by Air Products): 1%

Pure water: 65%

(6) Ink Composition of Example 6

Dispersion 1: 5%

C.I. Acid Red 94: 0.5%

Glycerin: 7%

Ethylene urea (water-soluble crystalline component): 9%

Stearic acid (EO) 40 adduct: 0.05%

Cetyl (EO) 20 adduct: 1%

Surfynol 465 (manufactured by Air Products): 1%

Pure water: 76.45%

(7) Ink Composition of Example 7

Dispersion 2: 6.7%

C.I. Acid Red 92: 0.5%

Glycerin: 7%

Ethylene urea (water-soluble crystalline component): 9%

Stearic acid (EO) 40 adduct: 0.05%

Cetyl (EO) 20 adduct: 1%

Surfynol 465 (manufactured by Air Products): 1%

Pure water: 74.75%

(8) Ink Composition of Example 8

Dispersion 2: 6.7%

C.I. Acid Red 92: 1.0%

Glycerin: 7%

Diethyl urea (water-soluble crystalline component): 8%

Stearic acid (EO) 40 adduct: 0.05%

Cetyl (EO) 20 adduct: 1%

Pure water: 76.25%

(9) Ink Composition of Example 9

Dispersion 2: 8%

C.I. Acid Red 52: 0.5%

Glycerin: 7%

Urea (water-soluble crystalline component): 8%

Stearic acid (EO) 40 adduct: 0.05%

Cetyl (EO) 20 adduct: 1%

Pure water: 75.45%

(10) Ink Composition of Example 10

Surfactant dispersion of C.I. Pigment Red 122 (manufactured by Fuji-Shikiso, ratio of pigment to surfactant=1:1): 2%

Diglycerin: 5%

1,3-Diethyl urea (water-soluble crystalline component): 9%

Sodium laureate: 0.5%

Isopropyl alcohol: 4%

Pure water: 79.5%

(11) Ink Composition of Example 11

Cabojet 300 (trade name: manufactured by Cabot): 10.0%

Glycerin: 5%

Trimethylolpropane: 5%

Ethylene glycol: 5%

Ethylene urea (water-soluble crystalline component): 9%

Surfynol 465 (manufactured by Air Products): 1%

Surfynol 440 (manufactured by Air Products): 0.2%

Pure Water: 68.4%

(12) Ink Composition of Example 12

Cabojet 300 (trade name: manufactured by Cabot): 10.0%

Glycerin: 5%

Urea (water-soluble crystalline component): 10%

Cetyl (EO) 20 adduct: 1%

Surfynol 465 (manufactured by Air Products): 1%

Surfynol 440 (manufactured by Air Products): 0.2%

Pure Water: 72.8%

(13) Ink Composition of Example 13

Dispersion 3: 12.5%

Diglycerin: 7%

Ethylene urea (water-soluble crystalline component): 5%

Sodium laureate: 0.5%

Isopropyl alcohol: 4%

Pure water: 71.0%

(14) Ink Composition of Comparative Example 1

Dispersion 2: 6.7%

Glycerin: 9%

Isopropyl alcohol: 4%

Pure water: 80.3%

(15) Ink Composition of Comparative Example 2

Dispersion 2: 6.7%

Diethylene glycol: 9%

Isopropyl alcohol: 4%

Pure water: 80.3%

(16) Ink Composition of Comparative Example 3

Dispersion 3: 6.6%

Diethylene glycol: 9%

2-Pyrrolidone (water-soluble crystalline component): 9%

Pure water: 75.4%

(17) Ink Composition of Comparative Example 4

Dispersion 3: 7%

Glycerin: 7%

2-Pyrrolidone (water-soluble crystalline component): 9%

Pure water: 77%

(18) Ink Composition of Comparative Example 5

Dispersion 1: 5%

Ethylene urea (water-soluble crystalline component): 7%

2-Pyrrolidone (water-soluble crystalline component): 9%

Pure water: 79%

(19) Ink Composition of Comparative Example 6

Dispersion 1: 5%

Glycerin: 9%

Ethylene urea (water-soluble crystalline component): 5%

Pure water: 81%

(20) Ink Composition of Comparative Example 7

Surfactant dispersion of C.I. Pigment Red 122 (manufactured by Fuji-Shikiso, pigment: surfactant=1:1): 2%

Diglycerin: 5%

2-Pyrrolidone (water-soluble crystalline component): 9%

Isopropyl alcohol: 4%

Pure water: 80.0%

(21) Ink Composition of Comparative Example 8

IJX 266 (trade name: manufactured by Cabot): 2.0%

2-Pyrrolidone (water-soluble crystalline component): 9%

Surfynol 465 (manufactured by Air Products): 1%

Pure Water: 88%

(22) Ink Composition of Comparative Example 9

Dispersion 2: 7%

C.I. Acid Red 52: 0.5%

Diethylene glycol: 9%

Isopropyl alcohol: 4%

Pure water: 79.5%

<Evaluation>

(Evaluation by Observation of Evaporated Ink)

15 g of ink of each of Examples and Comparative Examples was placed in a glass Petri dish and left open for 1 month in a 50° C. environment. Thereafter, the ink was observed visually and then by a stereoscopic microscope (at a magnification of 165) to be evaluated based on the following criteria.

AA: The ink has flowability. By microscopic observation, crystals are recognized in the ink and many aggregates of water-dispersible coloring materials formed around the crystal cores (a condition as shown in FIG. 9) are observed.

A: The ink has flowability. By microscopic observation, crystals are recognized in the ink and a small number of aggregates of water-dispersible coloring materials having crystal cores (a condition as shown in FIG. 9) are observed.

B: The ink has flowability, but by microscopic observation, crystals are not recognized in the ink.

Figure 10:
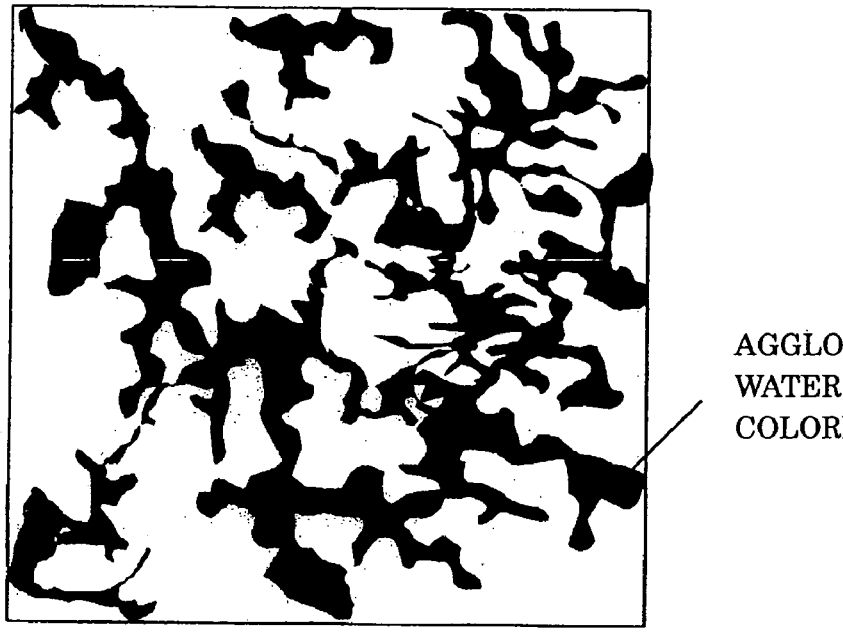
FIG. 10 is a schematic view illustrating formation of agglomerates of a water-dispersible coloring material.

C: The ink has no flowability. Furthermore, by microscopic observation, agglomeration of water-dispersible coloring materials (a condition as shown in FIG. 10) is recognized over the observed area.

(Evaluation of Stability)

Ink of each of Examples and Comparative Examples was placed in an airtight glass container and left for 1 month in a 60° C. environment. Thereafter, the ink was visually observed to be evaluated based on the following criteria.

A: Sediment or separation of ink components was not recognized.

B: Separation was recognized at the interface of the ink.

C: Large amount of sediment was recognized.

(Evaluation of Storability)

Ink of each of Examples and Comparative Examples was placed in an airtight glass container and left for 1 month in a 60° C. environment, and then left for another day in an ordinary temperature environment. Thereafter, the ink was visually observed and a storability of the ink was evaluated based on the following criteria.

A: Sediment or suspended matter was not recognized, nor separation of ink components.

B: Sediment or suspended matter was slightly recognized.

C: Separation was recognized at the vapor-liquid interface of the ink.

D: Large amount of sediment was recognized.

(Evaluation of Anti-Sticking Property)

15 g of ink of each of Examples and Comparative Examples was placed in a glass Petri dish and left open for 1 month in a 50° C. temperature environment. Thereafter, the ink was evaluated based on the following criteria:

AA: The ink had satisfactory flowability;

A: The ink had flowability and was in a liquid state as a whole with some viscosity, but practically had no problem;

B: The ink had little flowability and is stringy, which ill-affected discharging properties; and C: The ink had no flowability.

Next, ink of each of Examples and Comparative Examples was evaluated by use of a commercially available on-demand type ink jet printer BJF600 (trade name: manufactured by Canon Inc.) and in accordance with the following process and criteria. The results are shown in Table 2.

(Evaluation of Discharge Properties)

A prescribed amount of ink was charged into an ink tank for BJF600 and alphanumeric characters were recorded on commercially available fine quality paper until the ink was used up. Thereafter, a recorded matter at the beginning of the recording and that at the end of the recording were compared and the discharging properties were evaluated based on the following criteria:

A: No change was recognized;

B: Slight deterioration of quality was recognized;

C: Substantial deterioration of quality was recognized or discharge failure was recognized.

(Evaluation of Clogging)

A prescribed amount of ink was charged into an ink tank for BJF600 and alphanumeric characters were recorded on commercially available fine quality paper. Thereafter, the ink jet printer containing the ink was left for 1 month in a 30° C. environment and then alphanumeric characters were recorded on commercially available bond paper. A recorded matter at the beginning of the recording and that at the end of the recording were compared and the clogging property was evaluated based on the following criteria.

AA: The recording was carried out in the same manner from the beginning to the end of the recording.

A: Although slight discharge failure was recognized at the beginning of the recording, satisfactory recording was carried out thereafter and therefore there was practically no problem.

B: Discharge failure occurred continuously from the beginning to the end of the recording.

C: The ink was not discharged at all and the recording could not be carried out.

(Evaluation of Fluorescent Property 1)

A solid image of Duty 50% was printed on commercially available bond paper in a 23° C. and 50% RH environment. Fluorescent intensity of the printed product was measured at an excitation wavelength of 254 nm and an emission wavelength of 600 nm (conditions at which intensity of the coloring material used in each of Examples and Comparative Examples is most easily measured) by using a fluorescent intensity measuring apparatus FP-750 (manufactured by Nihon Keikoh Kabushikikaisha (spelled in accordance with pronunciation)). Then, fluorescent intensity was evaluated based on the following criteria:

A: Fluorescent intensity$\geq$400

B: 400>fluorescent intensity$\geq$350

C: 350>fluorescent intensity.

(Evaluation of Fluorescent Property 2)

The same process as in Evaluation 1 was carried out in a low temperature and low humidity (15° C. and 10%) environment and evaluation was carried out based on the same criteria as in Evaluation 1.

(Evaluation of Water Resistance)

A prescribed amount of ink was charged into an ink tank for BJF600 and alphanumeric characters were recorded on commercially available A4 size bond paper. The recorded matter was left for 1 day in an ordinary temperature environment and then dipped in city water for 5 minutes. Change of the recorded matter was evaluated based on the following criteria.

AA: No recognizable deterioration of the alphanumeric characters was observed.

A: Although slight bleeding was recognized around the alphanumeric characters, they were still readable.

B: Bleeding of the ink was remarkable around the alphanumeric characters and they were almost illegible.

C: The alphanumeric characters were almost washed away.

TABLE 2

| Evaluation | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Aggregate formation | AA | AA | AA | AA | AA | AA | AA | AA | AA | AA | A | A | AA |
| Stability | A | A | A | A | A | A | A | A | A | A | A | A | A |
| Storability | A | A | A | A | A | A | A | A | A | A | A | A | A |
| Anti-sticking property | A | A | A | A | A | AA | AA | AA | AA | A | A | A | A |
| Discharge property | A | A | A | A | A | A | A | A | A | A | A | A | A |
| Clogging | AA | AA | AA | A | AA | AA | AA | AA | AA | A | AA | AA | AA |
| Fluorescent property 1 | — | — | — | — | — | — | A | A | A | — | — | — | — |
| Fluorescent property 2 | — | — | — | — | — | — | A | A | A | — | — | — | — |
| Water resistance | AA | AA | AA | AA | AA | AA | AA | AA | AA | AA | A | A | AA |

| Evaluation | Comparative Example | | | | | | | | |
|---|---|---|---|---|---|---|---|---|---|
| | 1 | 2 | 3 | 4 | 5 | 6 | 7 | 8 | 9 |
| Aggregate formation | C | C | C | C | C | C | C | C | C |
| Stability | A | A | A | A | A | A | A | A | A |
| Storability | A | A | A | A | A | A | A | A | A |
| Anti-sticking property | B | C | C | B | C | B | B | B | C |
| Discharge property | C | C | C | C | C | B | C | B | C |
| Clogging | B | B | B | B | B | B | B | B | B |
| Fluorescent property 1 | — | — | — | — | — | — | — | — | C |
| Fluorescent property 2 | — | — | — | — | — | — | — | — | C |
| Water resistance | AA | AA | AA | AA | AA | AA | AA | B | AA |

As described above, according to the present invention, it is possible to provide an aqueous ink having improved reliability in terms of anti-sticking property and clogging resistance that were shortcomings of an aqueous ink while taking full advantage of fastness properties of an aqueous ink employing a water-dispersible coloring material, and having capability of providing a resultant recorded matter which has satisfactory quality of printing including coloring property and has improved stability and reliability. Further, according to the invention, it is also possible to provide an ink jet recording method using such ink, a recorded matter formed by the recording method, and an apparatus employing such ink. Furthermore, according to the present invention, it is possible to provide ink effectively suppressing deterioration with age of fluorescent intensity of a recorded matter, an ink jet recording method using such ink, a recorded matter formed by the recording method, and an apparatus employing such ink.

What is claimed is:

1. An aqueous ink comprising:
   an aqueous medium;
   a water-dispersible coloring material dispersed in the aqueous medium;
   a water-soluble substance, wherein the water-soluble substance has a crystal-forming property and can hold the water-dispersible coloring material around a crystal thereof; and
   an organic solvent that dissolves the water-soluble substance,
   wherein the water-soluble substance is contained at a saturation concentration or more with respect to the organic solvent,
   wherein the water-dispersible coloring material is contained at a concentration of not less than 0.1% by mass and not more than 1.5% by mass, and
   wherein the water-soluble substance crystallizes as a water content in the aqueous medium decreases from an initial condition where the coloring material is dispersed and the water-soluble substance is dissolved in the aqueous medium, and the coloring material in the dispersed state aggregates around a crystal of the water-soluble substance as a core.

2. The ink according to claim 1, wherein the water-soluble substance has a ring structure.

3. The ink according to claim 1, wherein the water-soluble substance is ethylene urea.

4. The ink according to claim 1, further comprising a water-soluble dye dissolved in the ink.

5. The ink according to claim 1, further comprising a fluorescent dye dissolved in the ink.

6. A recorded image formed on a fibrous recording medium by use of an aqueous ink according to claim 1.

7. A method of forming an image comprising the steps of:
   discharging an aqueous ink according to claim 1 as an ink droplet from an ink jet head; and
   applying the ink droplet onto a recording medium to form an image.

* * * * *

UNITED STATES PATENT AND TRADEMARK OFFICE
CERTIFICATE OF CORRECTION

PATENT NO. : 7,267,716 B2
APPLICATION NO. : 11/193377
DATED : September 11, 2007
INVENTOR(S) : Akira Nagashima et al.

It is certified that error appears in the above-identified patent and that said Letters Patent is hereby corrected as shown below:

COLUMN 1

Line 52, "H08-23191 1" should read --H08-231911--.

COLUMN 3

Line 29, "cross sectional" should read --cross-sectional--.

Line 31, "cross sectional" should read --cross-sectional--.

COLUMN 4

Line 66, "inventions" should read --inventors--.

COLUMN 5

Line 6, "forms" should read --form--.

COLUMN 13

In Table 1-1, in the chemical drawing shown beside "Rhodamine 6G":
the substituent —Br should be replaced by the substituent —CH₃

COLUMN 16

Lines 7-13, the text "(II)" and the chemical drawing shown above the words "1,5-sorbitan ester" should be deleted and replaced with the following text and chemical drawing:

(II)
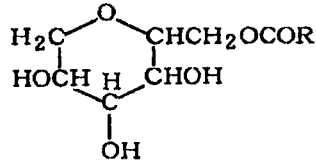

UNITED STATES PATENT AND TRADEMARK OFFICE
CERTIFICATE OF CORRECTION

PATENT NO. : 7,267,716 B2
APPLICATION NO. : 11/193377
DATED : September 11, 2007
INVENTOR(S) : Akira Nagashima et al.

It is certified that error appears in the above-identified patent and that said Letters Patent is hereby corrected as shown below:

COLUMN 17

Line 16, "antiseptics" should read --antiseptic--.

Line 16, "anti mold" should read --anti-mold--.

Line 66, "includes a method" should read --include a method--.

COLUMN 18

Line 5, "cross sectional" should read --cross-sectional--.

Line 6, "cross sectional" should read --cross-sectional--.

Line 24, "discharge" should read --discharges--.

COLUMN 20

Line 42, "hour" should read --hours--.

Line 59, "hour" should read --hours--.

COLUMN 21

Line 12, "hour" should read --hours--.

Line 34, "hour" should read --hours--.

COLUMN 22

Line 13, "glycol: 0.7%" should read --glycol: 7%--.

Line 26, "Surfynol 4.65" should read --Surfynol 465--.

UNITED STATES PATENT AND TRADEMARK OFFICE
CERTIFICATE OF CORRECTION

PATENT NO. : 7,267,716 B2
APPLICATION NO. : 11/193377
DATED : September 11, 2007
INVENTOR(S) : Akira Nagashima et al.

It is certified that error appears in the above-identified patent and that said Letters Patent is hereby corrected as shown below:

COLUMN 25

Line 53, "is" should read --was--.

Signed and Sealed this

Third Day of June, 2008

JON W. DUDAS
*Director of the United States Patent and Trademark Office*